March 10, 1959

E. F. DAWKINS 2,876,732

APPARATUS FOR DEPOSITING AN ANNULAR METAL
COATING UPON A WORK-PIECE

Filed Jan. 11, 1955

INVENTOR
Edwin Frank Dawkins

ATTORNEYS

March 10, 1959
E. F. DAWKINS
2,876,732
APPARATUS FOR DEPOSITING AN ANNULAR METAL
COATING UPON A WORK-PIECE
Filed Jan. 11, 1955
5 Sheets-Sheet 2
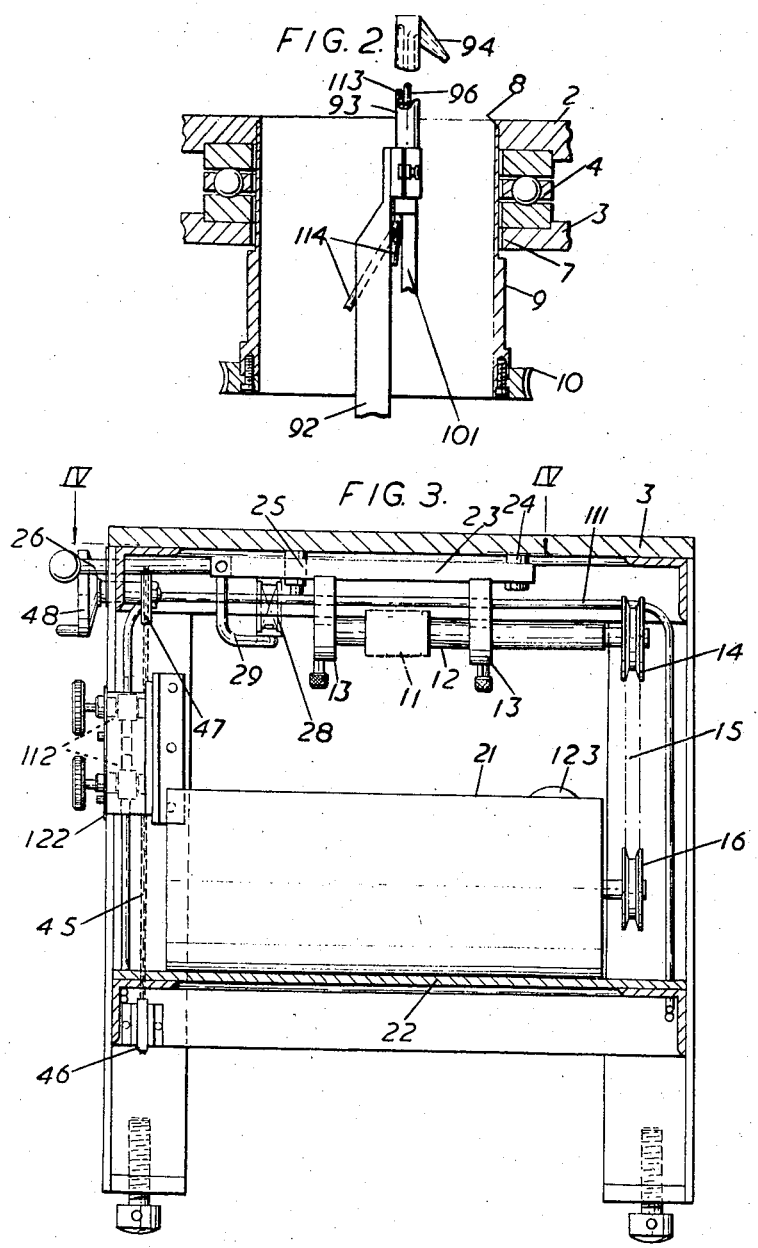
INVENTOR
Edwin Frank Dawkins
BY
ATTORNEYS

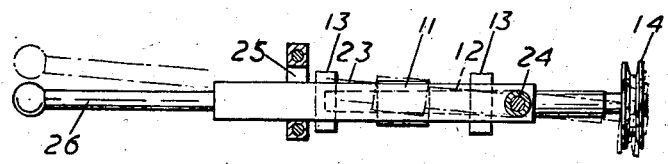
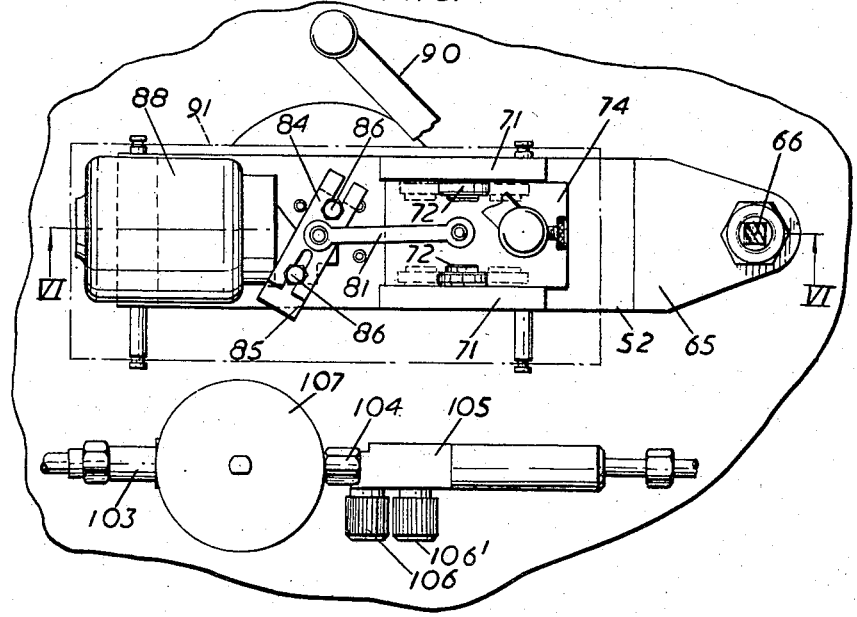

March 10, 1959

E. F. DAWKINS 2,876,732

APPARATUS FOR DEPOSITING AN ANNULAR METAL
COATING UPON A WORK-PIECE

Filed Jan. 11, 1955

INVENTOR
Edwin Frank Dawkins
BY

ATTORNEYS

March 10, 1959 E. F. DAWKINS 2,876,732
APPARATUS FOR DEPOSITING AN ANNULAR METAL
COATING UPON A WORK-PIECE
Filed Jan. 11, 1955 5 Sheets-Sheet 5

United States Patent Office
2,876,732
Patented Mar. 10, 1959

2,876,732

APPARATUS FOR DEPOSITING AN ANNULAR METAL COATING UPON A WORK-PIECE

Edwin Frank Dawkins, London, England, assignor to Dewrance & Co. Limited, London, England, a British company Application January 11, 1955, Serial No. 481,214

Claims priority, application Great Britain January 13, 1954

3 Claims. (Cl. 118—47)

This invention relates to welding apparatus for effecting a weld deposited facing on an annular surface of a work-piece. In connection with steam valves, for example, it may be desired to provide on internal surfaces of the valve body hard metal facings from which to form the valve seat faces. Such facings are suitably produced through the deposition of weld metal of proper composition and hitherto the deposition has been effected manually. In a large valve the facing operation takes a considerable time and requires skill and concentration from an operator handicapped by difficulty of access and suffering discomfort due to the necessity of heating the valve body. An object of the invention is the provision of automatic welding apparatus whereby a weld deposited facing may formed on an annular surface of a work-piece.

Another object of the invention is the provision of automatic welding apparatus adapted for the formation of a weld deposited facing on an annular surface of a work-piece by operating with the discharge of weld metal in powder form in a combustible gas stream.

Another object is the provision of automatic welding apparatus suitable for use in forming on annular internal surfaces of a parallel slide valve body weld-deposited facings on which the valve seat faces may be formed.

Further objects and advantages of the invention will be apparent from the subsequent description of an embodiment of the invention.

The invention will now be described, by way of example, with reference to the accompanying drawings, in which:

Figure 2 is a front elevation of part of the apparatus in section including the axis of a turn-table adapted for supporting the work-piece;

Figure 3 is a side elevation of the apparatus in section on the line III—III of Figure 1;

Figure 4 is a plan view in section on the line IV—IV of Figure 3, showing parts of the turn-table driving means;

Figure 5 is a plan view of constituents for positioning and oscillating a blow-pipe;

Figure 1:
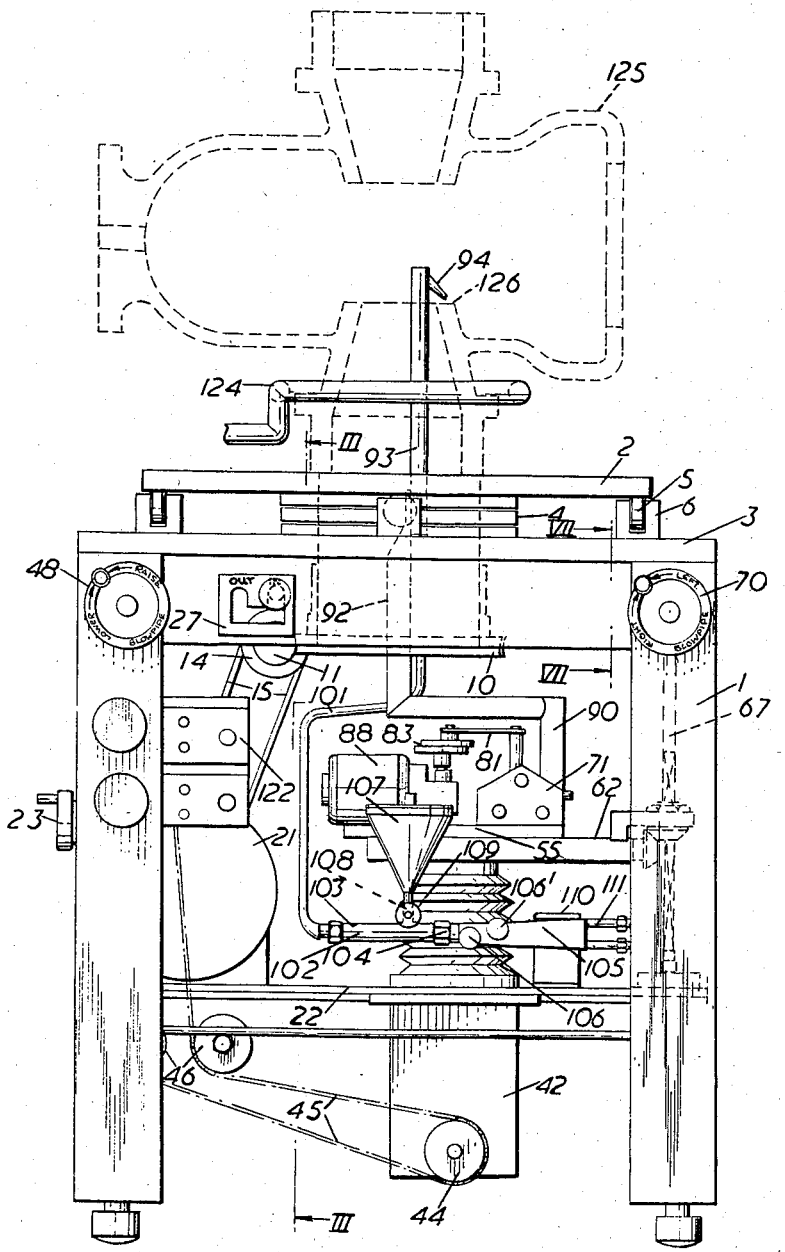
Figure 1 is a front elevation of a welding apparatus for effecting weld deposition of a hard metal facing in the interior of a parallel slide valve body.

Referring to the drawings, an apparatus for effecting on an annular internal surface of a parallel slide valve the weld deposition of a facing which after machining will provide one of the parallel valve seat faces comprises a rectangular body frame 1 on which is mounted a turn-table 2.

The turn-table is supported by a top plate 3 of the frame through an annular ball thrust bearing 4 and through a number of rollers 5 acting near the periphery of the turn-table and rotatable in brackets 6 fixed to the top plate 3. The top plate 3 is formed, within the annulus of the ball thrust bearing 4, with a circular aperture 7 which corresponds with a central circular aperture 8 in the turn-table, and through which there extends downwardly a cylindrical member 9 secured at its upper end to the turn-table and at its lower end to a worm-wheel 10. The worm-wheel can be driven by a worm 11 engaging therewith.

The worm 11 is mounted on a horizontal driving shaft 12, which is carried in two bearing supports 13, one on each side of the worm. The shaft 12 terminates at one end in one of the bearing supports 13, projects through the other of the bearing supports 13 and at its other end carries a pulley 14 to take a V-belt 15, which engages also a pulley 16 driven by an electric motor 21 mounted on a lower plate 22 of the body frame. The electric motor 21 is mounted near the left side of the body frame (Figure 1) with its axis parallel to the side of the body frame.

The bearing supports 13 depend from a block 23 pivotally supported at 24 at its rear end and near its front end supported by a support 25 which affords the block such a degree of movement that the latter can be rotated horizontally about its pivot to bring the worm 11 out of or into engagement with the worm-wheel 10. An operating lever 26 extends forwardly from the front of the block 23, to which it is pivoted for vertical movement. The operating lever 26 extends through a slot plate 27 mounted on the front of the body frame, which has an "in" recess in which the operating lever rests when there is engagement between the worm 11 and worm-wheel 10 and an "out" recess in which the operating lever rests when the worm 11 and worm-wheel 10 are out of engagement. The operating lever is biassed to remain in either of the two recesses in which it may be placed by a biassing spring 28 operating in compression between the block 23 and an arm 29 welded to the operating lever 26.

Figure 6:
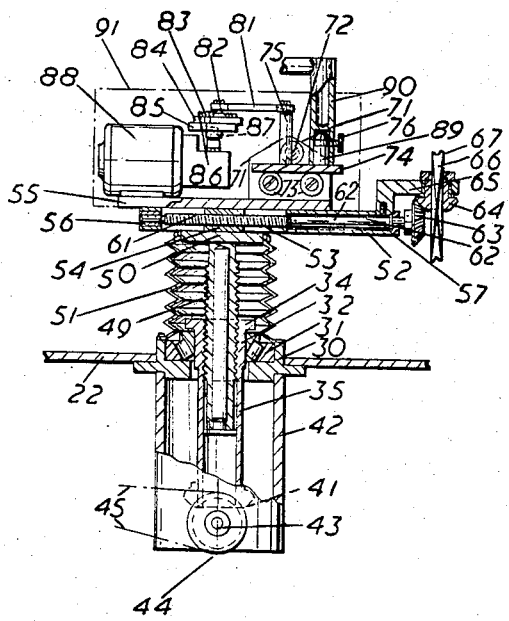
Figure 6 is a front elevation of some of said constituents partly in section on the line VI—VI of Figure 5.
Figure 7:
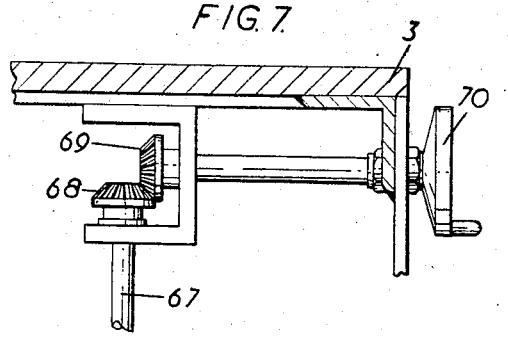
Figure 7 is a side elevation of a detail of the apparatus as viewed from the section line VII—VII of Figure 1.
Figure 8:
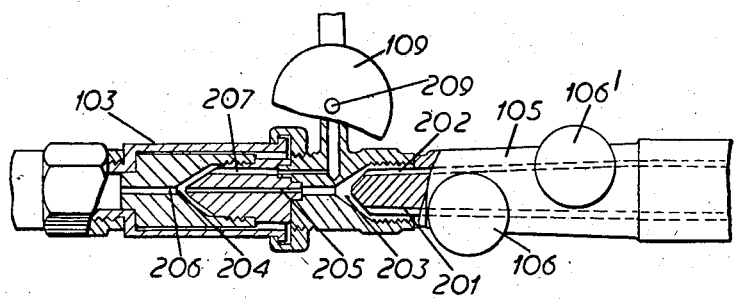
Figure 8 is an elevational view to a larger scale of parts of weld metal and gas mixture supply means, hereinafter referred to, the elevation being partly in section to show certain internal chambers and passageways.
Figure 9:
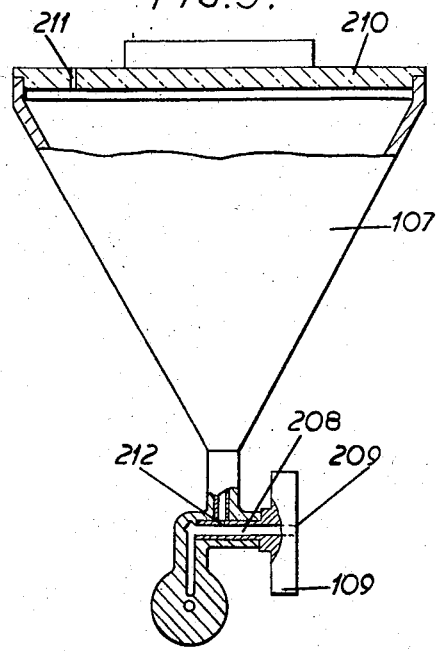
Figure 9 is another elevational view of said supply means at right angles to the elevation of Figure 8, and also partly in section.

The lower plate 22 of the body frame is formed, somewhat towards its front and to the right of the electric motor, with an aperture in which, as shown by Figure 6, is secured a housing 30 for a roller thrust bearing 31. The thrust bearing 31 is interposed between the housing 30 and a part 32, provided with a flange 34 resting upon the thrust bearing, of a tubular member or spindle 35. The tubular member extends with its axis vertical and is provided at its lower end with a bevel spur wheel 41. To the housing 30 is secured a downwardly extending cylinder 42 which is coaxial with the tubular member 35 and which provides at its lower end support for a horizontal shaft 43 carrying a second bevel wheel engaging with the bevel wheel 41 on the tubular member.

The horizontal shaft 43 projects forwardly of the cylinder 42 and at its front end carries a sprocket wheel 44 with which engages an endless chain 45.

The chain 45 extends round a pair of sprockets 46 suitably mounted below the lower plate 22 and round a sprocket wheel 47 beneath the top plate 3 near the top of the apparatus, which sprocket wheel may be turned by a handwheel 48 at the front of the apparatus.

The uppermost length of the tubular member 35 is tapped and engages with a threaded portion of an elevating screw 49. The uppermost part of the elevating screw 51 is formed as a horizontal plate 50. A thin metal bellows 51, the purpose of which is to shield the thrust bearing from the access of metal powder, surrounds the elevating screw above the housing 30 and is secured to the housing 30 and to the horizontal plate 50 at the top of the elevating screw.

The horizontal plate 50 is secured to and carries a slide bed 52, which is formed with a slideway 53 within which fits a depending part 54 of a slide 55 which rests upon the upper face of the slide bed. The said depending part 54 is internally threaded and is engaged by a threaded part 61 of a rotary shaft 62, which is supported by bearings 56 and 57 within the slide bed and carries at an end outside the slide bed a bevel spur wheel 63. The bevel spur wheel 63 engages another bevel wheel 64 carried in a bracket 65 secured to the slide bed. The axis of the bevel wheel 64 is vertical and the said wheel is pierced with a square section aperture which engages with a squared portion 66 of a vertical rotary shaft 67 secured in appropriate bearings within the body frame. The uppermost part of the vertical shaft 67 carries a bevel wheel 68 engaging another bevel spur wheel 69, which may be rotated by a handwheel 70 situated at the front of the apparatus.

By rotating the handwheel 70 in one direction or the other, the shaft 62 within the slide bed may be turned in one direction or the other and the slide 55 as a consequence moved in one direction or the other parallel to the shaft 62. Since the spur wheel 64 on the vertical shaft 67 is carried by the bracket 65 secured to the slide bed 52, the slide bed cannot rotate about the axis of the elevating screw 49, whereby rotation of the handwheel 48 operating the chain 45 will raise or lower the slide bed. During the raising or lowering of the slide bed, the bevel wheel 64 carried by the bracket 65 slides over the squared portion 66 of the vertical shaft 67.

The slide 55 comprises a rectangular plate provided at one end with a pair of parallel vertical side plates 71. On each side plate, in front of its surface facing the other side plate, are mounted an upper roller 72 and two lower rollers 73, one to each side of the upper roller 72. The two upper rollers 72 are arranged to engage the top face, while the two lower rollers 73 engage the lower face of a support plate 74 making a sliding fit between the vertical side plates 71. The arrangement is such that the support plate is capable of sliding only horizontally and in one direction or the other parallel to the shaft 62 in the slide bed 52. The support plate 74 carries a vertical pillar 75 to the upper end of which there is pivotally attached a horizontal connecting rod 81 pivotally attached at its other end to a vertical pillar 82 on a crank 83. The crank consists of a rectangular upper bar 84, on which the pillar 82 is welded, and a rectangular lower bar 85. The upper bar is secured to the lower bar by bolts 86, which extend through slots in the upper bar which permit of the adjustment of the position of the upper bar relative to the lower bar. The lower bar is secured to a vertical output shaft 87 of a reduction gearing arranged to be driven by an electric motor 88 mounted at the other end of the slide 55 from the side plates 71.

When the electric motor 88 rotates, the crank 83, operating through the connecting rod 81, reciprocates the support plate 74. By adjustment of the relative position between the upper plate and the lower plate of the crank the throw of the crank can be altered to regulate the amplitude of the reciprocating movement.

The support plate 74 is provided with a second vertical pillar 89 to which is secured the lower end of a support member 90 for the weld metal depositing means. The support member 90 is formed with a socket fitting with the pillar 89 and is rotatable about and readily separable from the pillar 89 and may be clamped in adjustable position by a screw 76.

The reference numeral 91 indicates the position that may be occupied by a cover for the apparatus mounted on the slide 55. The support member 90, when such cover is in place, projects through a slot in the cover.

The support member 90 is successively bent so as to terminate in an upright section 92 below or within or extending through the aperture 7 (see Figure 2); to the upper end of the upright section 92 is removably secured the lower end of a conduit 93. At the top of the conduit 93 a discharge nozzle 94 projects therefrom laterally and downwardly. The conduit 93 comprises an outer jacket surrounding an inner pipe 96 which leads to the nozzle metal welding powder entrained in a combustible mixture of air, oxygen and acetylene. The gas mixture and welding powder for the nozzle is supplied to the lower end of the pipe 96 through an armoured flexible tube 101 from supply means 102 therefor.

The supply means 102 for the combustible gas mixture with entrained welding powder is adapted for operation to effect the method of applying to a metal surface for welding or coating described in U. S. patent specification No. 2,786,779, which comprises supplying powdered metal and combustible gases to a nozzle whereby the powdered metal is fused in the flame of said gases at the nozzle and combined with the fused surface to which the flame is applied, the powdered metal being drawn into the stream of combustible gases by an aspirating effect created by the passage of said gases to the nozzle. The details of the supply means 102 may be as described in U. S. patent specification No. 2,786,779 or as described in British patent specification No. 757,711.

The supply means 102, as shown in Figures 1, 5, 8 and 9, include a control body 105 through bores 201 and 202 in which there flow respective streams of oxygen under pressure and acetylene gas under pressure under the control of valves adjustable by respective control knobs 106 and 106'. The bores 201 and 202 lead to a gas mixing chamber 203 in an aspirator assembly 103; in the chamber 203 the oxygen and acetylene streams mix; from the chamber 203 the stream of mixed gases is led to a forwardly tapering annular aspirator chamber 204 in the aspirator assembly through a passage 205 which enters the aspirator chamber 204 axially and opposite an outlet passage 206 which leads axially away from the aspirator chamber apex and discharges to the flexible tube 101. Within the aspirator assembly a second passage 207 leads into the aspirator chamber, said passage 207 connecting with a passage 208 which communicates with the atmosphere through an inlet 209. The outlet from the said passage 207 into the aspirator chamber is spaced from the axis of the latter whereby air attaining to the said chamber through the passage 207, in flowing through the tapering aspirator chamber to the outlet 206, flows into the mixture gas stream passing through the aspirator chamber in directions making an acute angle with the forward direction of the gas stream. The passage 208 leads beneath the outlet of a welding powder hopper 107 and the welding powder is picked up by the stream of atmospheric air induced into the aspirator chamber by the flow of oxygen and acetylene mixture through the aspirator chamber. Suitable valve means, e. g. a needle valve at the inlet 209, may be provided for the control of the atmospheric air stream.

The powder hopper 107 is closed by a transparent removable cover 210 and is vented to atmosphere through an aperture 211 in said cover; the discharge outlet from the bottom of said hopper into the passage 208 is furnished by an orifice 212 which can be replaced by an orifice or orifices of different area by turning a knurled handle 109; in addition the handle 109 may be turned so that the discharge outlet is closed. The aspirator assembly 103, control body 105 and hopper 107 form a replaceable unit which is mounted by the securement of the control body to a bracket 110 on the lower plate 23 of the apparatus. The powder hopped 107 is situated near the front of the apparatus to facilitate observation through the cover of the rate of use of the welding powder and to facilitate replenishment of the hopper when necessary.

The oxygen and acetylene pipes 111 to be led to the supply means 102 are suitably led to the apparatus at the back thereof, pass from the back of the apparatus to the front above the electric motor 21, pass downwardly through stop valves 112 operable from the front of the apparatus and in front of the electric motor 21 and to the other side of the apparatus below the lower plate 22 preparatory to entering the control body 105.

The conduit 93 leading to the nozzle is cooled by water flowing in the space between the inner pipe 96 and the outer jacket. In order to provide the necessary flow of water through the length of the space, the water is introduced to the end of the space near the combustible mixture discharge nozzle 94 through a water pipe 113 accommodated within the space, the water travelling through the space back to the lower end of the conduit. Flexible hose 114 for the supply and removal of cooling water are connected to the lower ends of the pipe 113 and the conduit 93 respectively. Suitably the cooling water is brought to and leaves the apparatus at the rear thereof.

A control panel 122 for the two electric motors 21 and 88 is mounted on the front of the apparatus. The motor 21 has a friction drive speed variator, adjustable by a handle 123 at the left of the apparatus, interposed in the drive from the rotating parts of the motor to the shaft carrying the pulley 16.

A gas ring 124, formed in hinged parts for facilitating positioning of the ring around the inlet or outlet branch of the valve which is placed on the turn-table, is arranged above the apparatus.

The reference numeral 125 indicates the position that may be occupied by a parallel slide valve body on which a hard facing is to be deposited. In the said position the annular surface 126 within the valve body intended to receive the hard facing lies in a plane normal to the axis of rotation of the turn-table and the said axis passes through the centre of the said annular surface.

In the operation of the apparatus described, after the valve body has been placed on the turntable in the position described, the handwheel 48 and the handwheel 70 are operated until the blow-pipe nozzle 94 is located at a distance above the turntable and at a distance from the axis of rotation of the turn-table suitable for the deposition of weld metal on the annular surface 126 within the valve body intended to receive the hard facing, and the throw of the crank 83 is adjusted to vary the to and fro movement of the nozzle between the proper limits relative to the said annular surface. The gas ring 124 is fitted around the lower branch of the valve body a short distance below the valve chamber. The powder hopper 107 is filled with the appropriate welding powder and a flow of cooling water is established in the outer jacket of the conduit 93.

The valve body is now rotated by the electric motor 21 and the gas ring 124 is lighted up to heat the valve body until it reaches a temperature of the order of 500° C. or so. When the valve body is sufficiently hot the heating by the gas ring is continued sufficiently to maintain the valve body at the desired temperature and the turn-table speed is reduced to a speed at which the annular surface on which the hard facing is to be deposited rotates past the combustible mixture discharge nozzle at only a slow speed; for example, the body of a parallel slide valve the valve seat of which is to be of 15 inches diameter may be set to rotate on the turn-table at the rate of one revolution in 20 minutes. The electric motor 88 is started so that the nozzle is moved to and fro, for example, at the rate of 13 reciprocations per minute, across the annular surface passing beneath it. The oxygen and acetylene stop valves 112 are opened, the oxygen and acetylene flow rates are appropriately regulated by the valves 106 and 106' in the control body 105, and the mixture is ignited at the nozzle 94 for the acetylene in the pressure gas mixture to burn in the oxygen in the pressure gas mixture. The flame from the nozzle is directed upon the metal surface intended to receive the facing so that the surface is raised to a semi-molten or "sweating" state. The handle 109 is turned so that the powdered metal is drawn at the desired rate into the air stream induced by the aspirator, and the powder is carried in the mixture of air, oxygen and acetylene to the nozzle. The powder in passing through the flame is heated and upon contacting with the metal of the surface fuses therewith, thereby forming a facing of hard metal. As the valve body is slowly rotated while the nozzle is moved to and fro across the surface intended to receive the facing the whole surface is progressively covered by a substantially uniform covering of weld metal.

After the valve body has been rotated through a complete revolution, the handle 109 is turned to cut off the supply of powder and the valve body is rotated through a complete revolution while the flame alone plays upon the metal facing which has been deposited.

After completion of the second complete revolution, the oxy-acetylene flame being extinguished, the turn-table is rotated at a higher speed and the valve body is heated by means of the gas ring to a suitable stress relieving temperature, after which the heating is gradually diminished so that the valve body slowly cools.

The worm 11 may be thrown out of engagement with the worm-wheel 10 by operating the lever 26 should it be desired to rotate the valve body quickly by hand for purposes of inspection or to bring under the nozzle any particular area of the surface or of the facing deposited thereon that may need additional treatment.

Those skilled in the art will understand that changes may be made in the form of the apparatus disclosed without departing from the spirit of the invention covered by the subsequent claims.

What is claimed is:

1. Welding apparatus for effecting a weld deposited facing on an annular surface of a workpiece, comprising; a gas mixing chamber, means for connecting said chamber to a source of combustible gas under pressure and to a source of combustion-supporting gas under pressure for mixing of the gases in said chamber to form a combustible mixture under pressure, a combustible mixture discharge nozzle receiving a combustible mixture from said chamber, an aspirator connected between and in communication with said chamber and said nozzle for flow of the combustible mixture therethrough from the chamber to the nozzle, conduit means directly connected at one end to said aspirator and having its opposite end communicating with the atmosphere for aspiration of atmospheric air into the mixture flowing through the said aspirator, a container for powdered metal vented to atmosphere above the level of powdered metal therein and having a discharge outlet connected to said conduit means at a point spaced from said opposite end for entrainment of powdered metal into the air stream aspirated into the combustible mixture, positioning means adapted to locate the nozzle in relation to the annular surface for depositing discharged metal in a condition to adhere to a region of the annular surface, means for effecting relative rotation about the centre of the annular surface of the nozzle and the workpiece, and means for reciprocating the nozzle simultaneously with said relative rotation unidirectionally so that the said region travels from side to side of the annular surface.

2. Welding apparatus for effecting a weld deposited facing on an annular surface of a workpiece, comprising; a gas mixing chamber, means for connecting said chamber to a source of combustible gas under pressure and to a source of combustion-supporting gas under pressure for mixing of the gases in said chamber to form a combustible mixture under pressure, a combustible mixture discharge nozzle receiving the combustible mixture from said chamber, an aspirator connected between and in communication with said chamber and said nozzle for flow of the combustible mixture therethrough from the chamber to the nozzle, conduit means directly connected at one end to said aspirator and having its opposite end communicating with the atmosphere for aspiration of atmospheric air into the mixture flowing through said aspirator, a container for powdered metal vented to atmosphere above the level of powdered metal therein and having a discharge outlet connected to said conduit means at a point spaced from said opposite end for entrainment of powdered metal into the air stream aspirated into the combustible mixture, positioning means adapted to locate the nozzle in relation to the annular surface for depositing discharged metal in a condition to adhere to a region of the annular surface, a turn-table for supporting the workpiece, means for heating the workpiece independently of the nozzle, variable speed driving means for rotating the turn-table, and means for reciprocating the nozzle simultaneously with the rotation of the turn-table unidirectionally so that the said region travels from side to side of the annular surface.

3. Welding apparatus for effecting a weld deposited hard facing on an interior annular surface of a parallel slide valve body, comprising a gas mixing chamber, means for connecting said chamber to a source of combustion gas under pressure and to a source of combustion-supporting gas under pressure for mixing of the gases in said chamber to form a combustible mixture under pressure, a combustible mixture discharge nozzle receiving the combustible mixture from said chamber, an aspirator connected between and in communication with said chamber and said nozzle for flow of the combustible mixture therethrough from the chamber to the nozzle, conduit means directly connected at one end to said aspirator and having its opopsite end open to atmosphere for aspiration of atmospheric air into the mixture flowing through said aspirator, a container for powdered metal vented to atmosphere above the level of powdered metal therein and having a discharge outlet connected to said conduit means at a point spaced from said opposite end for entrainment of powdered metal into the air stream aspirated into the combustible mixture, a turn-table for supporting the parallel slide valve body and formed with a central aperture therein, driving means for rotating the turn-table, supporting means for the nozzle extending through the aperture in the turn-table and adapted to support the nozzle in relation to the annular surface for depositing discharged metal in a condition to adhere to a region of the annular surface, a carriage beneath the turn-table for carrying and supporting the supporting means, and means for reciprocating the carriage simultaneously with the rotation of the turn-table unidirectionally so that the said region travels from side to side of the annular surface.

References Cited in the file of this patent

UNITED STATES PATENTS

| | | |
|---|---|---|
| 1,070,035 | Horrell | Aug. 12, 1913 |
| 1,256,599 | Schoop | Feb. 19, 1918 |
| 1,281,672 | Schorn | Oct. 15, 1918 |
| 1,617,166 | Schoop | Feb. 8, 1927 |
| 1,758,473 | Schoop | May 13, 1930 |
| 1,831,535 | Juers | Nov. 10, 1931 |
| 1,978,415 | Collins | Oct. 30, 1934 |
| 2,267,296 | Bennewitz et al. | Dec. 23, 1941 |
| 2,316,959 | Hinkley et al. | Apr. 20, 1943 |
| 2,317,173 | Bleakley | Apr. 20, 1943 |
| 2,424,418 | Rory | July 22, 1947 |
| 2,431,781 | Wagner | Dec. 2, 1947 |